(12) United States Patent
Nürnberg et al.

(10) Patent No.: US 11,504,888 B2
(45) Date of Patent: Nov. 22, 2022

(54) METHODS FOR PRODUCING SPORTING GOODS

(71) Applicant: adidas AG, Herzogenaurach (DE)

(72) Inventors: Hans-Peter Nürnberg, Herzogenaurach (DE); Henry Niles Hanson, Herzogenaurach (DE); Martin Löhner, Herzogenaurach (DE); Dietmar Klaus Drummer, Herzogenaurach (DE); Jörg Vetter, Herzogenaurach (DE); Mirjam Lucht, Herzogenaurach (DE); Heinz Hohensinner, Herzogenaurach (DE); André Schmidt, Herzogenaurach (DE); Norbert Stark, Herzogenaurach (DE); Winfried Schmidt, Herzogenaurach (DE); Markus Hohenberger, Herzogenaurach (DE); Stephan Lintner, Herzogenaurach (DE); Muhammad Tausif, Herzogenaurach (DE); Tom O'Hare, Herzogenaurach (DE); Parikshit Goswami, Herzogenaurach (DE); Stephen John Russell, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 66 days.

(21) Appl. No.: 15/824,222

(22) Filed: Nov. 28, 2017

(65) Prior Publication Data

US 2018/0147752 A1    May 31, 2018

(30) Foreign Application Priority Data

Nov. 28, 2016  (DE) .......................... 102016223567.2

(51) Int. Cl.
*B29C 39/26* (2006.01)
*B29C 41/06* (2006.01)
(Continued)

(52) U.S. Cl.
CPC ................ *B29C 39/26* (2013.01); *A43B 5/00* (2013.01); *A43B 23/0215* (2013.01);
(Continued)

(58) Field of Classification Search
CPC ......... B29C 41/04; B29C 41/06; B29C 41/18; B29C 41/22; B29C 41/46; B29D 35/142
See application file for complete search history.

(56) References Cited

U.S. PATENT DOCUMENTS 3,035,309 A * 5/1962 Bingham, Jr. ........... A43B 3/02
                                                  264/255
3,668,056 A    6/1972 Hayes, Jr.
(Continued)

FOREIGN PATENT DOCUMENTS

CN         2822277       10/2006
CN        104647757       5/2015
(Continued)

OTHER PUBLICATIONS

DuPont, "Hytrel: Injection Molding Guide," 2000 (Year: 2000).*
(Continued)

*Primary Examiner* — Christopher T Schatz
(74) *Attorney, Agent, or Firm* — Kilpatrick Townsend & Stockton LLP

(57) ABSTRACT

Methods for producing at least a part of a sporting good, in particular a sports shoe, can include: (a) depositing a first material into a mold, and (b) vibrating the mold to modify the distribution of the first material in the mold.

17 Claims, 7 Drawing Sheets

(51) Int. Cl.

| | | |
|---|---|---|
| *B29C 41/22* | (2006.01) | |
| *B29D 35/12* | (2010.01) | |
| *B29C 41/20* | (2006.01) | |
| *A43B 5/00* | (2022.01) | |
| *A43B 23/02* | (2006.01) | |
| *B29C 39/02* | (2006.01) | |
| *B29C 39/38* | (2006.01) | |
| *B29K 105/04* | (2006.01) | |
| *B29C 41/46* | (2006.01) | |
| *B29C 44/44* | (2006.01) | |
| *B29C 41/36* | (2006.01) | |
| *B29C 44/34* | (2006.01) | |
| *B29C 44/04* | (2006.01) | |
| *B29K 75/00* | (2006.01) | |
| *B29K 33/04* | (2006.01) | |
| *B29L 31/50* | (2006.01) | |
| *B29L 31/52* | (2006.01) | |

(52) U.S. Cl.
CPC ............ *B29C 39/02* (2013.01); *B29C 39/38* (2013.01); *B29C 41/06* (2013.01); *B29C 41/20* (2013.01); *B29C 41/22* (2013.01); *B29D 35/122* (2013.01); *B29D 35/126* (2013.01); *B29D 35/128* (2013.01); *B29C 41/36* (2013.01); *B29C 41/46* (2013.01); *B29C 44/04* (2013.01); *B29C 44/358* (2013.01); *B29C 44/445* (2013.01); *B29C 2791/008* (2013.01); *B29K 2033/04* (2013.01); *B29K 2075/00* (2013.01); *B29K 2105/04* (2013.01); *B29K 2995/007* (2013.01); *B29L 2031/50* (2013.01); *B29L 2031/52* (2013.01)

(56) References Cited

U.S. PATENT DOCUMENTS

| | | |
|---|---|---|
| 3,915,608 A | 10/1975 | Hujik |
| 4,606,868 A | 8/1986 | Christoph et al. |
| 4,657,716 A | 4/1987 | Schmidt |
| 4,671,755 A | 6/1987 | Graae |
| 5,073,325 A | 12/1991 | Gray |
| 5,223,193 A | 6/1993 | Bianchin et al. |
| 5,894,023 A | 4/1999 | Schramm et al. |
| 6,589,470 B2 | 7/2003 | Fried et al. |
| 7,582,238 B1 | 9/2009 | Yomazzo et al. |
| D709,680 S | 7/2014 | Herath |
| 8,840,825 B2 | 9/2014 | Wiesemann et al. |
| D740,003 S | 10/2015 | Herath |
| D740,004 S | 10/2015 | Hoellmueller et al. |
| 9,327,431 B2 | 5/2016 | Kuijt et al. |
| D758,056 S | 6/2016 | Galway et al. |
| D776,410 S | 1/2017 | Galway et al. |
| D783,264 S | 4/2017 | Hoellmueller et al. |
| 9,610,746 B2 | 4/2017 | Wardlaw et al. |
| 9,781,970 B2 | 10/2017 | Wardlaw et al. |
| 9,781,974 B2 | 10/2017 | Reinhardt et al. |
| 9,788,598 B2 | 10/2017 | Reinhardt et al. |
| 9,788,606 B2 | 10/2017 | Reinhardt et al. |
| 9,795,186 B2 | 10/2017 | Reinhardt et al. |
| 9,820,528 B2 | 11/2017 | Reinhardt et al. |
| 9,849,645 B2 | 12/2017 | Wardlaw et al. |
| 9,930,928 B2 | 4/2018 | Whiteman et al. |
| 9,968,157 B2 | 5/2018 | Wardlaw et al. |
| 10,039,342 B2 | 8/2018 | Reinhardt et al. |
| D828,686 S | 9/2018 | Hoellmueller et al. |
| D828,991 S | 9/2018 | Herath |
| D840,136 S | 2/2019 | Herath et al. |
| D840,137 S | 2/2019 | Herath et al. |
| 10,259,183 B2 | 4/2019 | Wardlaw et al. |
| D851,889 S | 6/2019 | Dobson et al. |
| D852,475 S | 7/2019 | Hoellmueller |
| D853,691 S | 7/2019 | Coonrod et al. |
| D853,699 S | 7/2019 | Coonrod et al. |
| D855,297 S | 8/2019 | Motoki |
| 10,506,846 B2 | 12/2019 | Wardlaw et al. |
| D873,543 S | 1/2020 | Coonrod et al. |
| D875,359 S | 2/2020 | Dobson et al. |
| D882,927 S | 5/2020 | Bruns et al. |
| D882,928 S | 5/2020 | Bruns et al. |
| 10,639,861 B2 | 5/2020 | Minh Le et al. |
| 10,645,992 B2 | 5/2020 | Le et al. |
| 10,667,576 B2 | 6/2020 | Reinhardt et al. |
| D889,810 S | 7/2020 | Hoellmueller et al. |
| D891,051 S | 7/2020 | Smith et al. |
| 10,716,358 B2 | 7/2020 | Reinhardt et al. |
| 10,721,991 B2 | 7/2020 | Whiteman et al. |
| 10,723,048 B2 | 7/2020 | Kirupanantham et al. |
| 10,730,259 B2 | 8/2020 | Kurtz et al. |
| D895,234 S | 9/2020 | Motoki et al. |
| 10,759,096 B2 | 9/2020 | Smith et al. |
| D899,061 S | 10/2020 | Coonrod et al. |
| D906,648 S | 1/2021 | Hoellmueller |
| 10,905,919 B2 | 2/2021 | Le et al. |
| 10,925,347 B2 | 2/2021 | Smith et al. |
| 10,952,489 B2 | 3/2021 | Kormann et al. |
| D915,055 S | 4/2021 | Herath et al. |
| D915,749 S | 4/2021 | Groneck |
| D916,444 S | 4/2021 | Callow et al. |
| 10,974,476 B2 | 4/2021 | Le et al. |
| D925,179 S | 7/2021 | Hoellmueller |
| D927,154 S | 8/2021 | Coonrod et al. |
| D928,479 S | 8/2021 | Le et al. |
| 11,291,268 B2 | 4/2022 | Wardlaw et al. |
| 2001/0020757 A1 | 9/2001 | Fried et al. |
| 2002/0114941 A1 | 8/2002 | Franke et al. |
| 2011/0035966 A1 | 2/2011 | Geer |
| 2014/0000043 A1* | 1/2014 | Boardman ............. A43D 3/02 12/107 R |
| 2015/0050379 A1* | 2/2015 | Ginns .................. A43B 23/17 425/500 |
| 2015/0118341 A1* | 4/2015 | Kuijt .................... B29C 33/02 425/144 |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2017/0259474 A1 | 9/2017 | Holmes et al. |
| 2017/0340067 A1 | 11/2017 | Dyckmans et al. |
| 2017/0341326 A1 | 11/2017 | Holmes et al. |
| 2017/0341327 A1 | 11/2017 | Le et al. |
| 2018/0235310 A1 | 8/2018 | Wardlaw et al. |
| 2019/0291371 A1 | 9/2019 | Wardlaw et al. |
| 2020/0060383 A1 | 2/2020 | Le et al. |
| 2020/0113280 A1 | 4/2020 | Wardlaw et al. |
| 2020/0221820 A1 | 7/2020 | Le et al. |
| 2020/0253328 A1 | 8/2020 | Reinhardt et al. |
| 2020/0315290 A1 | 10/2020 | Reinhardt et al. |
| 2020/0329809 A1 | 10/2020 | Whiteman et al. |
| 2020/0329812 A1 | 10/2020 | Le et al. |
| 2020/0391417 A1 | 12/2020 | Smith et al. |
| 2021/0016531 A1 | 1/2021 | Kurtz et al. |
| 2021/0113893 A1 | 4/2021 | Le et al. |
| 2021/0161249 A1 | 6/2021 | Smith et al. |
| 2021/0195985 A1 | 7/2021 | Kormann et al. |
| 2021/0219655 A1 | 7/2021 | Duemler et al. |

FOREIGN PATENT DOCUMENTS

| | | | |
|---|---|---|---|
| CN | 104718057 A | 6/2015 | |
| DE | 3916874 | 11/1990 | |
| DE | 4006648 | 9/1991 | |
| DE | 4107454 | 9/1992 | |
| DE | 102005003074 | 7/2006 | |
| DE | 102005014942 | 10/2006 | |
| DE | 102007019862 | 11/2008 | |
| DE | 102014218297 | 3/2016 | |
| EP | 1308256 | 5/2003 | |
| EP | 1308256 A1 * | 5/2003 | ............ B29C 41/04 |
| EP | 2176059 | 9/2011 | |
| EP | 2564712 | 3/2013 | |
| EP | 2767181 | 8/2014 | |
| EP | 2786670 | 10/2014 | |

(56) References Cited

FOREIGN PATENT DOCUMENTS

| | | |
|---|---|---|
| EP | 2845504 | 3/2015 |
| EP | 2767183 | 4/2017 |
| GB | 815996 | 7/1959 |
| GB | 841540 A | 7/1960 |
| GB | 1311887 | 3/1973 |
| GB | 1363675 | 8/1974 |
| JP | S4964151 U | 6/1974 |
| JP | S4939138 | 10/1974 |
| JP | S5911231 | 1/1984 |
| JP | S63270001 | 11/1988 |
| JP | H03202329 | 9/1991 |
| JP | H0484901 | 3/1992 |
| JP | 04129501 | 4/1992 |
| JP | H0546303 | 6/1993 |
| JP | H06178702 | 6/1994 |
| JP | 06261802 | 9/1994 |
| JP | 08174718 | 7/1996 |
| JP | H1175803 | 3/1999 |
| JP | 11139002 | 5/1999 |
| JP | 2014158708 | 9/2014 |
| KR | 20140142201 | 12/2014 |
| WO | 2016077221 | 5/2016 |

OTHER PUBLICATIONS

German Patent Application No. 2016223567.2, Office Action dated Aug. 7, 2017, 6 pages (No English translation available. A summary of the Office Action is provided in the Transmittal Letter submitted herewith).
Chinese Patent Application No. 201711213155.3, Office Action dated May 23, 2019, 12 pages (English machine translation submitted).
Shungen, Yang, et al., "Handbook of Rubber Industry", Chemical industry Press, vol. 9 (Part II), Rubber Machinery, Aug. 1994, pp. 581-584 (English translation provided).
European Application No. 17202241.0, Extended European Search Report dated Apr. 24, 2018, 12 pages.
Japanese Patent Application No. 2017-226892, Office Action dated Mar. 5, 2019, 9 pages (English translation submitted).
German Patent Application No. 102016223567.2, "Office Action", dated Oct. 30, 2019, 10 pages (6 pages of English translation and 4 pages of Original document).
Japanese Application No. 2017-226892, Office Action dated Jul. 30, 2019, 8 pages (4 pages of English translation and 4 pages of Original document).
European Application No. 19194921.3, Extended Search Report dated Nov. 27, 2019, 7 Pages.
Chinese Application No. 201711213155.3, second Office Action, dated Jan. 21, 2020, 15 pages (machine English translation provided).
European Patent Application No. 17202241.0, Office Action, dated Mar. 25, 2020, 7 pages.
Japanese Patent Application No. 2017226892, Office Action dated Jan. 7, 2020, 8 pages (4 pages English translation and 4 pages Original document).
European Patent Application No. 19194921.3, Office Action dated Sep. 16, 2020, 5 pages.
European Patent Application No. 17202241.0, Office Action dated Aug. 18, 2020, 5 pages.
European Patent Application No. 19194921.3, Office Action dated Apr. 23, 2021, 4 pages.
Japanese Patent Application No. 2020-100568, Office Action, dated Jul. 6, 2021, 9 pages (English machine translation provided).
Unpublished U.S. Appl. No. 17/380,956, filed Jul. 20, 2021. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 17/384,557, filed Jul. 23, 2021. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 17/397,446, filed Aug. 8, 2021. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 17/399,842, filed Aug. 11, 2021, In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 29/679,962, filed Feb. 12, 2019. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 29/721,029, filed Jan. 17, 2020. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 29/730,512, filed Apr. 6, 2020. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 29/760,713, filed Dec. 3, 2020. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Unpublished U.S. Appl. No. 29/762,463, filed Dec. 16, 2020. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Appl. No. 29/767,743, filed Jan. 25, 2021. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Appl. No. 29/773,594, filed Mar. 10, 2021. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Appl. No. 29/774,470, filed Mar. 17, 2021. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Appl. No. 29/777,634, filed Apr. 7, 2021. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Appl. No. 29/800,246, filed Jul. 20, 2021. In accordance with the Waiver of the Copy Requirements in 37 CFR 1.98 for cited pending U.S. Patent Applications, 1287 O.G. 163 (Oct. 19, 2004), the cited, unpublished US Patent Application is available in the IFW and, therefore, not provided.
Unpublished U.S. Provisional U.S. Appl. No. 62/137,139, filed Mar. 23, 2015. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
European Patent Application No. 17202241.0, Office Action dated Jul. 21, 2021, 6 pages.
Chinese Application No. 202010668057.4, Office Action dated Nov. 1, 2021, 19 pages (English machine translation provided).

(56) References Cited

OTHER PUBLICATIONS

Japanese Patent Application No. 2020-100568, Office Action dated Feb. 1, 2022, 6 pages (English machine translation provided).
Chinese Patent Application No. 202010668057.4, Office Action dated Mar. 16, 2022, 16 pages (English machine translation provided).
German Application No. 102016223567.2, Office Action, dated May 25, 2022, 8 pages (4 pages of English machine translation and 4 pages of original document).
Chinese Patent Application No. 202010668057.4, Office Action dated Aug. 4, 2022, 13 pages (English machine translation provided).

* cited by examiner

METHODS FOR PRODUCING SPORTING GOODS

CROSS REFERENCE TO RELATED APPLICATION

This application is related to and claims priority benefits from German Patent Application No. DE 10 2016 223 567.2, filed on Nov. 28, 2016, entitled Methods for Producing Sporting Goods and Sporting Good ("the '567.2 application"). The '567.2 application is hereby incorporated herein in its entirety by this reference.

FIELD OF THE INVENTION

The present invention relates to methods for producing at least a part of a sporting good, in particular a sports shoe. Furthermore, it relates to a sporting good manufactured by such methods.

BACKGROUND

Injection molding is an established production method for the manufacture of components of sporting goods, such as sports shoes. It allows for the formation of a large variety of parts from a wide range of plastic materials. As it is generally known, injection molding comprises the steps of feeding one or more plastic materials into one or more heated barrels, mixing and forcing the molten material(s) into a mold cavity for subsequent cooling and hardening to the configuration of the cavity.

Various methods using injection molding are known, for example from U.S. Pat. No. 3,915,608 A, JP 1175803A, JP 1139002A, and U.S. Pat. No. 8,840,825 B2. Further prior art is disclosed in U.S. Pat. Nos. 4,671,755 A, 5,894,023 A, DE 10 2005 003074 A1, and EP 2 176 059 B1.

A large number of plastic materials are known in the prior art out of which parts for sporting goods may be manufactured. For example, shoe soles for sports shoes may be manufactured from ethylene-vinyl acetate (EVA), thermoplastic polyurethane (TPU), rubber, polypropylene (PP) or polystyrene (PS). Each of these different materials provides a specific combination of different properties that are more or less well suited for shoe soles of specific types of sports shoes, depending on the particular requirements of the respective type of sports shoe. For example, TPU is very abrasion-resistant as well as tear-resistant and foamed EVA provides a high amount of cushioning.

While injection molding generally operates with materials which are in a molten state during the injection, there are also other techniques in the prior art, wherein individual particles or the like are injected into a cavity. For example, applicant disclosed in EP 2 786 670, EP 2 767 183, EP 2 767 181, and EP 2 845 504, deformation elements for shoe soles comprising a plurality of randomly arranged particles. Moreover, WO 2016/077221 A1 discloses the production of constructs of footwear and components thereof by jet extrusion. Here jets or streams of materials are used that solidify as fibers, and which form into two- or three-dimensional webs as they are collected. The webs may be in the nature of films, membranes, or mats.

Other examples known from the prior art are the slush process as disclosed in DE 3916874, DE 4006648, and DE 4107454, or rotational molding as disclosed in DE 102007019862 A1, wherein molded parts may be molded from powder materials by applying them onto the walls of hot metal molds. Therefore, the metal molds are heated until the melting point of the powder materials so that they may be sintered together. Afterwards, the metal molds are severely cooled down for solidifying the powder materials so that the molded part may be removed from the metal molds. Thus, the metal molds are reheated for molding the next molded part. Especially for rotational molding, mostly material layers covering the whole metal mold with a homogenous thickness are produced.

However, a common disadvantage of the known methods is that typically a number of different components are needed, which are at first separately manufactured and then have to be interconnected. The latter step involves generally a high amount of manual work as well as the use of potentially harmful solvents and/or adhesives.

Therefore, the underlying objective of the present invention is to provide an improved method for producing at least a part of a sporting good, in particular a sports shoe, which is capable of at least partly overcoming some of the above-mentioned deficiencies of conventional production methods.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for producing at least a part of a sporting good comprises: depositing a first material into a mold; and vibrating the mold to modify a distribution of the first material in the mold.

In certain embodiments, the step of vibrating the mold comprises a two or three-dimensional movement of the mold.

In some embodiments, the method further comprises the step of at least one of partially melting and solidifying at least a portion of the first material.

In certain embodiments, the step of at least one of partially melting and solidifying comprises at least one of selective melting and solidifying a selected portion of the first material by using at least one of a localized heating source of the mold, a localized cooling source of the mold, and locally affecting the mold.

According to certain embodiments of the present invention, a method for producing at least a part of a sporting good comprises: depositing a first material into a mold; and at least one of partly melting and solidifying a selected portion of the first material by using at least one of a localized heating source of the mold, a localized cooling source of the mold, and locally affecting the mold.

In some embodiments, the step of at least one of partly melting and solidifying by using at least one of a localized heating source of the mold, a localized cooling source of the mold, and locally affecting the mold comprises a two- or three-dimensional movement of the mold.

In certain embodiments, the step of depositing the first material into the mold comprises a selective depositing of the first material into selected areas of the mold.

The selective depositing of the first material, in some embodiments, comprises a movement of the mold.

The selective depositing of the first material, in certain embodiments, is performed with an accuracy of less than 3 cm.

In certain embodiments, the method further comprises: depositing a second material into the mold; vibrating the mold to modify the distribution of the second material in the mold; and at least one of partially melting and solidifying at least a portion of the second material.

The second material, in some embodiments, is at least partly deposited onto the at least one of partially melted and solidified portion of the first material.

In certain embodiments, at least one of the first material and the second material comprise at least one of foamed particles and fibers.

The first and the second material, in certain embodiments, are from a same material class comprising a thermoplastic elastomer.

In some embodiments, the thermoplastic elastomer is selected from the group consisting of thermoplastic polyurethanes and thermoplastic polyester-elastomers. In further embodiments, the thermoplastic elastomer is selected from the group consisting of polyetheresters, polyesters, thermoplastic copolyamides, thermoplastic styrene, and butadiene-blockcopolymers.

In certain embodiments, at least one of the first material and the second material is at least one of a granule structure, a micro-granule structure, and a powder structure, wherein the at least one of the first material and the second material has a diameter of less than 5 mm.

In some embodiments, the method further comprises the step of positioning at least one insert in the mold at least one of before and after depositing at least one of the first material and the second material.

The mold, in certain embodiments, comprises a negative mold of a substantially complete sporting good.

The mold, in some embodiments, comprises a structured inner wall that is configured to determine a structure of an outer layer of an upper of a sport shoe.

In some embodiments, the mold is moved by a robot arm, the robot arm being capable of performing three-dimensional movements of the mold.

In certain embodiments, the mold comprises a multi-axis mounted mold.

BRIEF DESCRIPTION OF THE DRAWINGS

In the following detailed description, embodiments of the invention are described referring to the following figures.

BRIEF DESCRIPTION

Figure 1:
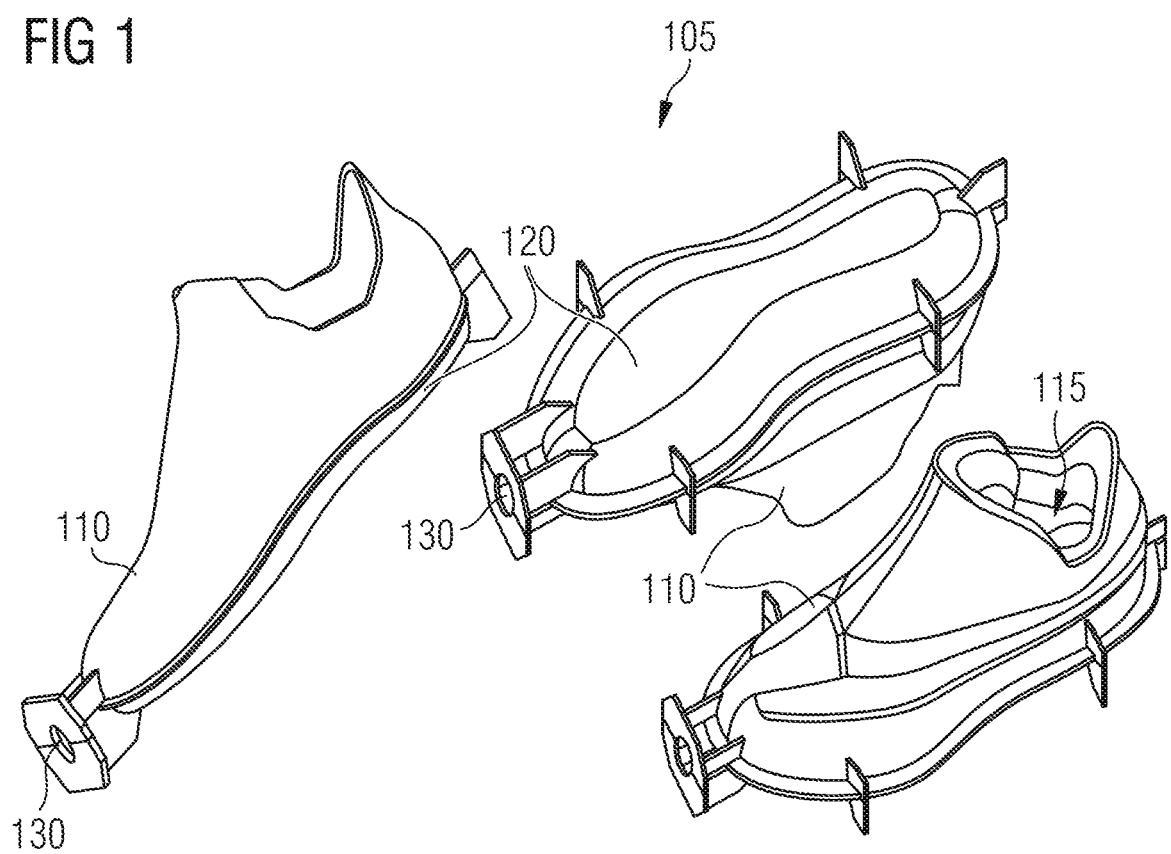
FIG. 1 is a perspective view, a bottom view, and a top view of a mold according to certain embodiments of the present invention for a system for producing at least a part of a sporting good, in particular a sports shoe.

This objective is at least partly solved by a method according to claim 1. In some embodiments, the method for producing at least a part of a sporting good comprises the steps of: (a) depositing a first material into a mold and (b) vibrating the mold to modify the distribution of the first material in the mold.

The inventors have realized that a vibration movement is beneficial to obtain a desired distribution of the first material in the mold. This may apply to a melted first material but applies in particular to particulate materials. The vibrating of the mold can, for example, be realized by shaking the mold, brandishing the mold (about at least one axes, for example), a back and forth movement, and an up and down movement, high accelerations etc. whereby oscillations occur about an equilibrium point. These vibrations may be periodic or random and may be performed by a robot arm. Therefore, the vibration movement is also beneficial to avoid any undesired cavities which would lead to a defective outsole. In some embodiments, another vibration entity, e.g. a mechanical shaker operated by a human worker, may perform the vibrations instead of the robot arm. Therefore, the vibration, which may be easily automated, may improve a reliable distribution of the particles into essentially all voids of the mold in a short amount of time. As a consequence, the time for a processing cycle is reduced. Also, the quality of the final sporting good is improved as the vibration may reduce the risk of defects in the final sporting good.

However, a vibration may also serve to achieve a specific non-uniform distribution of the first material. For example, if the vibration movement of the mold is combined with generally orienting the mold in a certain direction, a selective distribution of the first material within the mold by be obtained, such as an accumulation of particles only in the heel part of a mold for a shoe. Compared to known rotational molding processes, the method according to the present invention may be significantly more desirable due to the local covering of certain areas of the mold by the selective distribution of the first material. Therefore, the thickness of the first material may locally vary so that a sporting good with functionalized performance characteristics may be produced.

In some embodiments, vibrating the mold may comprise a two or three-dimensional movement of the mold. Such embodiments may further improve the modification of the distribution of the first material in the mold as the mold may be moved in four or six different directions in space.

In some embodiments, the method may further comprise the step of at least partially melting and/or solidifying at least a portion of the first material. Moreover, the melting and/or solidifying may comprise a selective melting and/or solidifying of a selected portion of the first material, in some embodiments, by using a localized heat and/or cooling source of the mold or locally affecting the mold. Furthermore, selectively melting and/or solidifying may comprise a two or three-dimensional movement of the mold. In certain embodiments, the whole material may get melted and solidified at defined areas of the mold surface which could be achieved by partially heating and/or cooling or an adjusted mold movement where only certain parts of the mold surface are in contact to the first material. Therefore, the above-mentioned aspect of a locally varying thickness may be further improved for producing a sporting good with functionalized performance characteristics.

In some embodiments, the melting may be partial. For example, when using expanded thermoplastic polyurethane (eTPU) particles as a first and/or second material, in some embodiments, only the surface of the particles may melt.

Moreover, if, for example, a localized heat and/or cooling source is arranged outside the mold or inside the mold in selected areas of the mold, the first material, e.g. a powder or granule structure, may be selectively melted and/or solidified on defined parts of the mold surface. For a localized heat and/or cooling source arranged outside the mold, moving the mold in two or all three dimensions may carry out the selective melting and/or solidifying. This is a fundamentally different manufacturing approach compared to regular injection molding or rotational molding, wherein all of the mold is filled with material and homogeneously melted and/or solidified throughout the mold. The inventors have found that such a selective melting and/or solidification is particularly useful for the manufacture of sporting goods, such as sport shoes, wherein the final product is made from a plurality of different materials and wherein a selective processing of a first material is desirable. Moreover, a localized heating reduces the power consumption of the producing process.

In some embodiments, depositing the material into the mold may comprise a selective depositing of the first material into selected areas of the mold. Moreover, the selective depositing of the first material may involve a movement of the mold. Furthermore, the selective depositing may be performed with an accuracy of less than 3 cm, in some embodiments, less than 2 cm and, in other embodiments, less than 1 cm. All of these embodiments follow the same idea for improving the whole producing process by providing the first material in an exactly dosed amount and in desired areas of the mold. The inventors have found that the indicated numerical values for the accuracy of the deposition may provide a good compromise between sufficient accuracy of the depositing step and high production speed in order to significantly reduce the overall cycle time of the producing process.

In some embodiments, the above described method of depositing material is done into the open mold allowing a good accessibility. The mold may be heated and/or cooled and moved during the depositing to allow for a defined positioning of the material. After depositing and adhering of the material the mold may be closed and further material layers may be generated as will be described in the following.

In some embodiments, the method according to the invention may further comprise the steps of (c) depositing a second material into the mold; (d) vibrating the mold to modify the distribution of the second material in the mold; and (e) melting and/or solidifying at least a portion of the second material. Moreover, the second material may be at least partly deposited onto the at least partially melted and/or solidified portion of the first material. The vibrating of the mold can for example be realized in the same manner as mentioned above.

The inventors have realized that the depositing of a second material after the first material allows for the production of a complete sporting good, for example a sports shoe, as a composite in one single mold. For example, if the first material has been molded to be a part of or a complete outsole, the second material may be molded to be a part of or the complete midsole of the sports shoe.

In some embodiments, the first material may be deposited into the mold. Then the first material may be at least partially melted and afterwards the first material is partially solidified. In some embodiments, the portion of the first material closest to the wall of the mold is solidified, and the rest of the first material stays in the melted and/or a granular state. In the next step, the mold may be moved and the molten and/or granular portion of the first material may be moved to another area within the mold and gets at least partially melted and/or solidified. By this procedure, the first material may be successively distributed within the mold by only depositing the first material into the mold at the beginning of the process.

In some embodiments, the first and/or the second material may comprise foamed particles and/or fibers. For example, the first and/or the second material may comprise chemical blowing agents leading to the foaming of defined part regions during processing. Moreover, the first and the second material may be from the same material class, in particular a thermoplastic elastomer. Furthermore, the thermoplastic elastomer may be selected from the group of thermoplastic polyurethanes, TPU, thermoplastic polyester-elastomers, in some embodiments, polyetherester and/or polyester/ester, thermoplastic copolyamides, and in other embodiments, thermoplastic styrene- and/or butadiene-blockcopolymers. Especially for elastomers on the basis of TPU, the thermoplastic elastomers may comprise a shore hardness from 30 A to 83 D.

Foamed particles provide excellent cushioning properties and are very light-weight. TPU is relatively easy to work with. Furthermore, TPU is an elastomer, which is shape-stable, deforming under tensile and compressive stress, but returning largely to its original shape in the stress-free state. Thus, TPU is very well suited to making sporting goods subjected to pressure, such as soles for sports shoes. TPU, be it as a solid material or in the form of expanded particles, is likewise suitable for sporting goods which are regularly exposed to impacts, such as shin guards for soccer players.

In some embodiments, the first and/or second material may be a granule, a micro-granule, or a powder structure, in some embodiments, with a diameter less than 5 mm, in other embodiments, with a diameter less than 3 mm and, in still other embodiments, with a diameter less than 1 mm. Such embodiments may be further beneficial for the selective distribution or the selective melting and/or solidifying of the materials.

In some embodiments, the method may further comprise the step of positioning at least one insert in the mold before and/or after depositing the first and/or the second material. Such embodiments enable that at least one elements, for example a supporting element for a midsole, may be positioned in the mold so that the producing of a sporting good providing specific performance characteristics in certain parts of the sole may be further improved. For example, the supporting element may support the sports shoe against torsion forces during movements of a user. In some embodiments, a shoe upper may be inserted before depositing the first and/or second material so that certain parts, e.g. a heel cap, may be directly molded onto the surface of the shoe upper. As a result, the overall cycle time for producing sporting goods may be further reduced with such an additional method step.

Having at least one insert also provides a synergistic effect with the vibration step explained above. The vibration will assure that the first and/or second material distributes as desired around the insert and thus improves the quality of final product.

The mold may be a negative mold of an essentially complete sporting good, in particular a shin guard, a ball or a sport shoe. It may comprise a structured inner wall, in particular a structured inner wall that is adapted to determine the outer appearance of an upper and/or a sole of a sport shoe. The described manufacturing method thus may not only provide a sporting good made from several materials but also provides the option to control the design of the sporting good.

In some embodiments, the mold may be moved by a robot arm, the robot arm being capable of performing 3D movements of the mold. Such a robot arm can not only easily transfer the mold between different processing stations, it can also subject the mold to the above described vibrations and therefore efficiently implement aspects of the present invention.

In some embodiments, the mold may be a multi-axis mounted mold. In some embodiments, the mold may have six degrees of freedom of motion.

According to a further aspect, the present invention relates to a sporting good, in particular sport shoe, wherein at least a part of the sporting good is produced by one of the methods described above.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The subject matter of embodiments and variations of the present invention are described in the following with particular reference to a sporting good, in particular a sports shoe. However, the concept of the present invention may identically or similarly be applied to any sporting goods such as shirts, pants or sports equipment such as a ball, a racket, etc. wherein at least a part of the sporting good is molded. In some embodiments, the concept of the present invention may be used for the manufacture of any three-dimensional part.

It is also to be noted that individual embodiments of the invention are described in greater detail below. However, it is clear to a person skilled in the art that the constructional possibilities and optional features described in relation to these specific embodiments may be further modified and combined with one another in a different manner within the scope of the present invention and that individual steps or features can also be omitted where they appear to be unnecessary to the skilled person. In order to avoid redundancies, reference is made to the explanations in the previous sections, which also apply to the embodiments of the following detailed description.

FIG. 1 presents embodiments of a mold 105 according to the present invention for producing at least a part of a sporting good, in particular a sports shoe. The mold 105 is presented in three different views (from left to right): a side view, a bottom view and a top view.

The mold 105 comprises two main parts, namely a top part 110 and a bottom part 120. For example, the top part 110 may correspond to a shoe upper and the bottom part 120 may correspond to a shoe sole. Therefore, the mold 105 is a negative mold of a complete sports shoe. In some embodiments, the negative mold 105 may be only for a part of the sports shoe, e.g. the shoe sole, and the shoe upper will be joined with the molded shoe sole in a separate producing process, for example by welding with infrared radiation.

Moreover, the top part 110 and the bottom part 120 of the negative mold 105 may be connected to each other by any suitable fasteners such as screws, nuts, rivets, clamps, magnets, etc. As may be seen in FIG. 1, the two parts 110 and 120 of the negative mold 105 may comprise pairwise holes for connecting to each other which may be arranged in an additional area of the negative mold 105 surrounding the junction between the top part 110 and the bottom part 120 as well as in an area perpendicular to this additional area. In the illustrated embodiments, there are three holes in the heel area of the negative mold 105, two in the midfoot area on the lateral side and on the medial side each and two in the toe area of the negative mold 105. Beneficially, such a configuration of attaching the top part 110 and the bottom part 120 of the negative mold 105 may thus provide high stability for the vibrating step of the molding process to obtain a desired distribution of the first material in the mold as mentioned above and explained in more detail below.

As may be seen on the right side in FIG. 1, the top part 110 of the negative mold 105 comprises an opening 115 in the collar area. This opening 115 may be used for supplying the first and/or second material into the negative mold 105. In some embodiments, the mold 105 may comprise at least one other opening(s) for supplying the first and/or second material. Additionally or alternatively, the first and/or second material may be supplied to the negative mold 105 when the two parts 110 and 120 are separated from each other, i.e. the open negative mold 105 may be filled with the first and/or second material.

In some embodiments, the negative mold 105 may be manufactured by an additive manufacturing method. Additive manufacturing can create very fine structures that cannot be obtained by traditional mold production techniques, or which are at least difficult or costly to produce. One benefit is therefore that the mass of the negative mold 105 may be significantly reduced without endangering the negative mold's stability during the molding process. As a consequence, a lower heat capacity of the negative mold 105 may be obtained. This in turn reduces the loss of energy, when heating the negative mold 105 and also leads to a faster cooling process as the reduced heat capacity will accelerate the cooling of the negative mold 105 at the end of the process cycle. Also, the vibration of the mold may be more easily implemented.

Moreover, the additive manufacturing method may involve laser sintering. However, other additive manufacturing methods such as 3D printing, stereolithography (SLA), selective laser melting (SLM) or direct metal laser sintering (DMLS), selective laser sintering (SLS), fused deposition modeling (FDM), etc. can additionally or alternatively be used to make the negative mold 105. In some embodiments, the additive manufacturing method may be used so that the negative mold 105 may consist of only one main part.

Furthermore, the negative mold 105 may comprise stainless steel alloys, stainless hot-work steels, precipitation hardening stainless steels, tool steels, aluminum alloys, titanium alloys, commercially pure titanium, hot-work steels, bronze alloys, nickel based alloys, cobalt based alloys, in particular, cobalt chromium tungsten alloys, copper alloys, precious metal alloys. Additionally or alternatively, any other material or a mixture of at least two materials may be used provided the material(s) have appropriate properties for a mold such as durability and/or heat conductivity.

As may be seen in FIG. 1, the negative mold 105 comprises a holding location 130 in its forefoot area. Such a holding location 130 may be connected with a device for vibrating, for example a robot arm (not shown in FIG. 1), to modify the distribution of the first and/or second material in the negative mold 105. The holding location 130 may be connected with the robot arm by screws, nuts, clamps, magnets or any other suitable fastener. In some embodiments, one part of the negative mold 105, for example the bottom part 120, may be permanently fixed to the robot arm or may even be a part of the robot arm. In some embodiments, the holding location 130 may be arranged in another area of the device for vibrating the mold 105, for example in the heel area, in the midfoot area, on the lateral or on the medial side of the negative mold 105. Additionally or alternatively, a plurality of holding locations 130 may also be used.

In some embodiments, the negative mold 105 may comprise at least one localized heat and/or cooling source(s) for the method step of selectively melting and/or solidifying of a selected portion of the first material in the negative mold 105 (not shown in FIG. 1). Such at least one localized heat and/or cooling source(s) may, for example, be arranged in the pairwise holes based on the configuration for connecting the two parts of the negative mold 105 as described above. They may comprise, for example, resistive heaters or carbon fiber based heating elements or any other methods to generate heat. Other heating methods may be, for example, radio frequency heaters or steam heaters.

In further embodiments, the negative mold 105 may comprise more than two parts in order to be split up into smaller parts to have more flexibility when the sporting good is produced. For example, the negative mold 105 may be built out of three negative molds, for example a forefoot part, a midfoot part and a heel part. Another option may also be to use such a split-up negative mold for the production of shin guards, whereby the different negative mold parts are adapted to different parts of the leg. As a result, the different negative mold parts may be interchangeable to adapt to different leg sizes and/or shapes.

In still further embodiments, the negative mold 105 may comprise a structured inner wall in the top part 110 or any other part. For example, the negative mold 105 may comprise grooves and/or protrusions on its inner surface in order to determine or at least influence the structure of the outer layer of an upper of a sports shoe.

Figure 2:
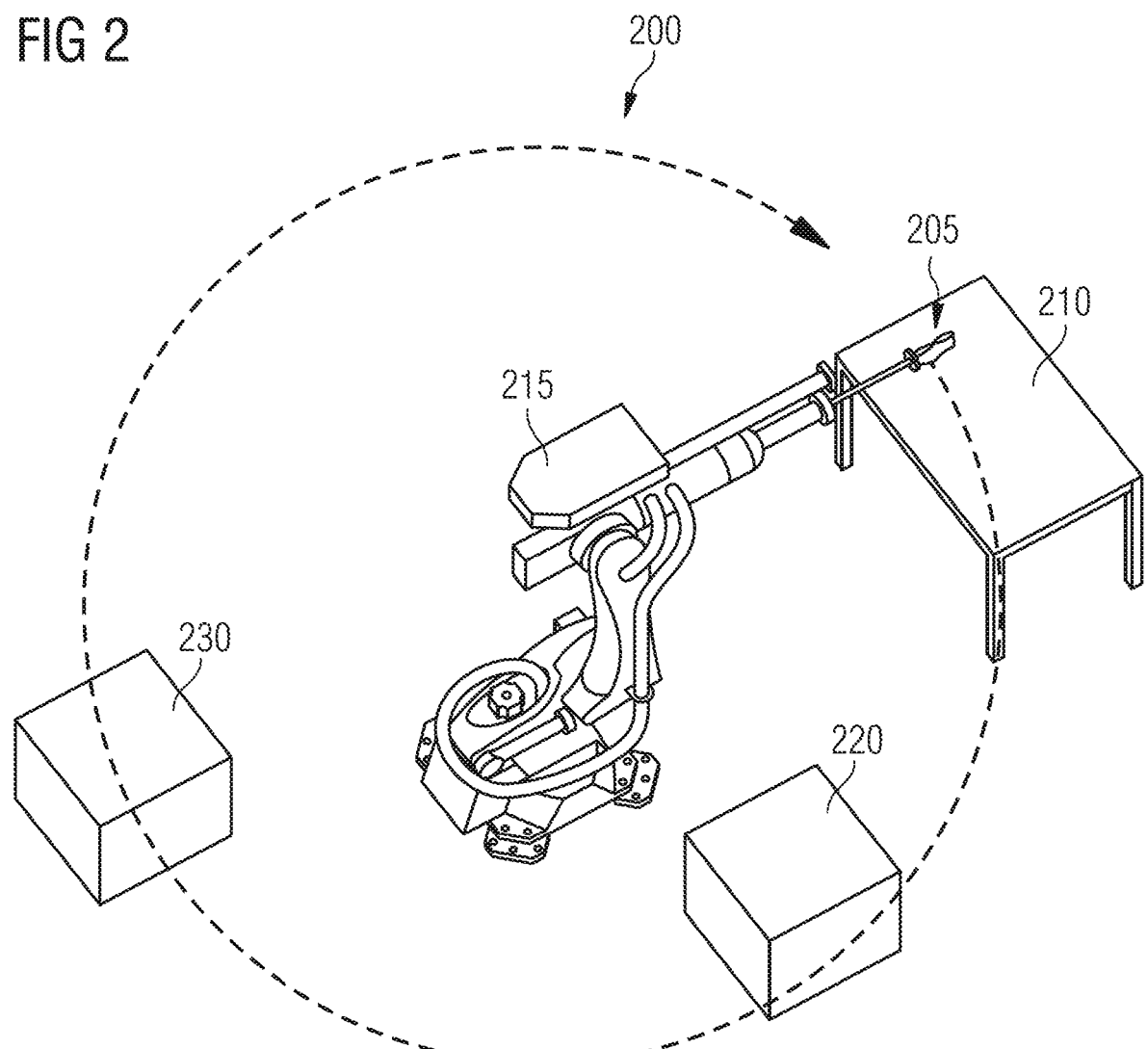
FIG. 2 is a schematic view of a system for producing at least a part of a sporting good, in particular a sports shoe according to certain embodiments of the present invention.

FIG. 2 presents a schematic view of embodiments of the present invention for a system 200 for producing at least a part of a sporting good, in particular a sports shoe. The system 200 may fully or partly perform at least one of the aforementioned methods, in particular the sequence of method steps: depositing a first and/or second material into a mold 205; vibrating the mold 205 to modify the distribution of the first and/or second material in the mold 205 and at least partially melting and/or solidifying at least a portion of the first and/or second material, wherein melting and/or solidifying may comprise selective melting and/or solidifying of a selected portion of the first and/or second material, in some embodiments, by locally affecting the mold 205. In the following, the method for producing a shoe sole for a sports shoe including an outsole and a midsole is further described. It is to be noted that the system 200 is, in some embodiments, fully automatic. However, human intervention to perform some or even all of the method steps are not excluded.

At the first station 210, a first material, for example TPU particles for an outsole, may be deposited into the mold 205 which is connected to a robot arm 215. In some embodiments, the first and/or second material may be a powder, granule structure, liquid or at least one fiber(s), e.g. fibers coated with TPU or any other suitable material, or any other form ready for depositing. In some embodiments, fibers may be functionalized by suitable techniques such as applying a plasma treatment. Additionally or alternatively, the mold 205 may comprise two or more parts and/or may be a negative mold such as explained with reference to the negative mold 105 in FIG. 1. Furthermore, the first material may be hand-filled into the mold 205 so that it may be deposited.

Moreover, the mold 205 may then be vibrated at the first station 210 to modify the distribution of the first material in the mold 205. The vibrating of the mold 205 can, for example, be realized by shaking the mold 205, brandishing the mold 205 (about at least one axes, for example), a very fast back and forth movement, and a very fast up and down movement, etc. whereby oscillations occur about an equilibrium point. These vibrations may be periodic or random and may be performed by the robot arm 215. Therefore, the vibration movement is beneficial to obtain a desired uniform distribution of the first material in the mold 205 and to avoid any undesired cavities which would lead to a defective outsole. In some embodiments, another vibration entity, e.g. a mechanical shaker operated by a human worker, located at the first station 210 may perform the vibrations instead of the robot arm 215.

In some embodiments, the first material may be selectively deposited into selected areas of the mold 205, wherein the selective depositing of the first material may involve a movement of the mold 205. For example, the robot arm 215 may position the mold 205 in a manner so that the first material for the outsole may only be deposited in the bottom part of the mold 205. Furthermore, if, for example, the outsole to be molded should comprise a thicker portion in the heel area than in the forefoot area, the robot arm 215 may tilt the mold 205 by some degrees, e.g. by 10°, so that the first material may be more deposited in the heel area of the mold 205 than in the forefoot area. As a result, the final outsole comprises a thicker heel portion compared to the forefoot portion. Moreover, in some embodiments, the mold 205 may be completely closed so that the first material may be deposited by a full rotation of the mold 205.

In other embodiments, the first and the second material may be two different materials, e.g. with different colors, hardness or particle sizes, which may be deposited into the same area of the mold for creating certain design or functional properties in this area.

Additionally or alternatively, at least one insert(s) (not shown in FIG. 2) such as a toe box, heel cap, side reinforcement elements, decorative elements, textile sock, particularly non-woven or knitted sock, etc. may be positioned in the mold 205 before and/or after depositing the first material to accelerate the whole producing process for the sports shoe and to provide specific technical features and/or designs. In some embodiments, a shoe upper may be positioned in the mold 205 before the first material for the outsole is deposited so that the outsole may be molded directly to the shoe upper.

As schematically shown in FIG. 2, the robot arm 215 may then transfer the mold 205 including the first material to a heating station 220. The heating station 220 may serve to at least partially melt and/or fuse the first material in the mold 205. For example, heat may be provided by an infrared "IR" source or a similar energy source. In some embodiments, the robot arm 215 may be moved so that only the bottom part of the mold 205 is affected so that a selected portion of the first material may be selectively melted. This may be achieved by the adjusted mold 205 movement through a movement of the robot arm 215. In some embodiments, the heat may be provided by at least one localized heat source(s) which are incorporated into the mold 205, for example, openings for hot air or water vapor.

In some embodiments, the whole surface of the mold 205 may be covered by the first material and the first material thickness may locally vary by defined locally adjusted heating or an adjusted movement of the mold 205 as will be explained with reference to FIGS. 3a-e.

The heated mold 205 may then be transferred by the robot arm 215 to a solidifying station 230 so that at least a portion of the first material may be at least partially solidified, wherein a selected portion of the first material may be selectively solidified. This may be achieved by moving the mold 205 through a movement of the robot arm 215. Once again, the selectively melting together with the selectively solidifying is a fundamentally different producing approach compared to regular injection molding or rotational molding of sporting goods, wherein all of the mold is filled with material and more or less homogeneously melted and/or solidified throughout the mold.

After solidifying the first material, the robot arm 215 may return to the first station 210 so that the second material, for example foamed particles of TPU for a midsole, may be deposited into the mold 205, e.g. at least partially onto the solidified portion of the first material, the mold 205 may be vibrated to modify the distribution of the second material in the mold 205 and at least partially melting and/or solidifying at least a portion of the second material.

FIGS. 3a-e present schematic illustrations of embodiments of the present invention for producing at least a part of a sports shoe. In particular, the embodiments illustrate movements of the mold 205, such as vibrating or orienting the mold 205, by the robot arm 215 at the heating station 220 and/or the solidifying station 230 in FIG. 2 as explained above and in a gimbal as will be explained in FIG. 3e.

Figure 3A:
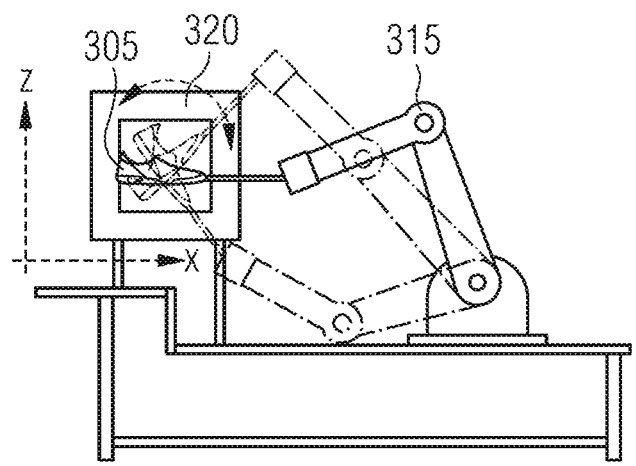
FIGS. 3a, 3b, 3c, 3d, and 3e are diagrams illustrating possible movements of a mold by a robot arm at a heating and/or solidifying station according to certain embodiments of the present invention for producing at least a part of a sports shoe.

FIG. 3a presents embodiments of the present invention of a robot arm 315 which is connected with a mold 305. The mold 305 may be similar to the mold 105 and 205 as mentioned above. A first material for an outsole may be deposited into the mold 305. In some embodiments, a second material for a midsole may be deposited into the mold 305 as mentioned above. The robot arm 315 may move the mold 305 inside a heating station 320 equipped with at least one heat source(s), e.g. IR heat sources, for selectively melting a selected portion of the first material, i.e. locally subjecting the first material in the mold 305 to heat. For example, the IR heat sources may be arranged only on the left sidewall of the heating station 320. In some embodiments, the robot arm 315 may move the mold 305 inside a solidifying station for selectively solidifying of a selected portion of the first material.

As may be seen in FIG. 3a, the movement, e.g. orienting the mold 305, may be performed in the x-z-plane. In some embodiments, the movement of the mold 305 may be performed in other spatial directions or even in all spatial directions. An adjusted movement for heating and thus selectively melting the first material in the mold 305 will be explained in the following with reference to FIGS. 3b-d. Additionally or alternatively, the mold 305 may be vibrated at any time of the movement in order to modify the distribution of the first material in the mold 305.

Figure 3B:
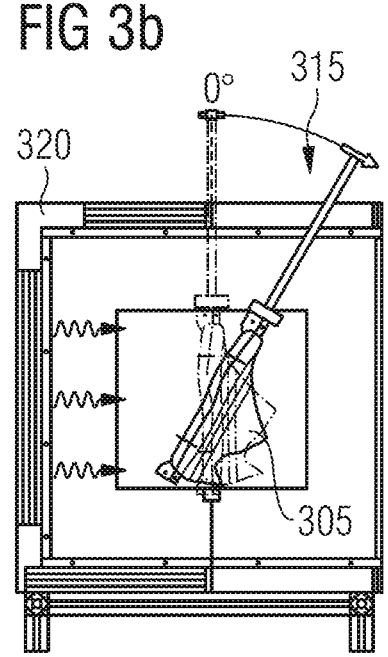

As may be seen in FIG. 3b, the movement may start when the robot arm 315 is essentially parallel to the z-axis. This position may be set as 0°. The robot arm 315 may then move the mold 305 clockwise in the x-z-plane. Therefore, the heel area of the mold 305 may be closer to the IR heat sources than the forefoot area, i.e. may be more heated up, so that the first material in the heel area may be selectively melted by the movement of the mold 305.

Figure 3C:
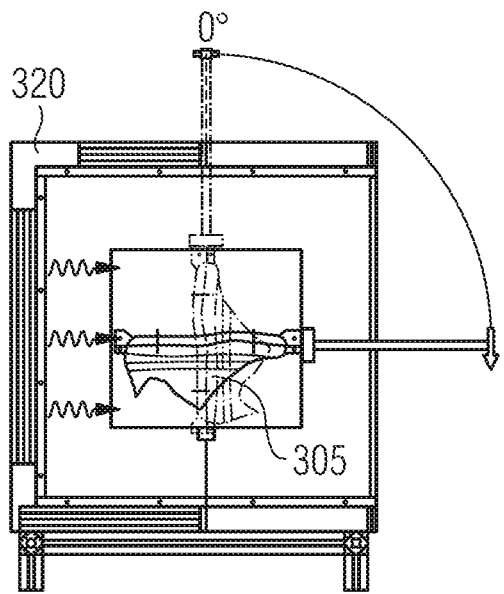

In FIG. 3c, the robot arm 315 is essentially parallel to the x-axis, a movement by 90° has been performed. In this position, the surface of the bottom and top part of the mold 305 may be affected with a minimum amount of IR heat radiation.

Figure 3D:
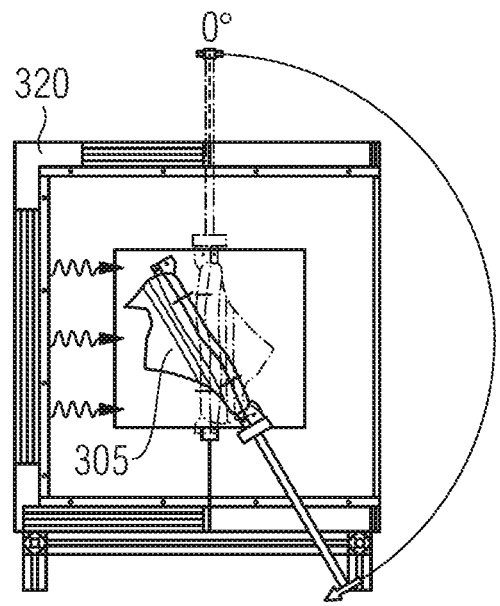

In FIG. 3d, the robot arm 315 may further move the mold 305 clockwise so that the surface of the top part may be more heated up than the bottom part of the mold 305 and the first material in the top part may be selectively melted. After the movement of the robot arm 315, the mold may be removed from the heating station 320 in order to be transferred to the solidifying station.

As a result, the method according to the present invention may prevent certain portions of the first material from being heated up twice during the heating process by the movement of the mold 305.

Figure 3E:
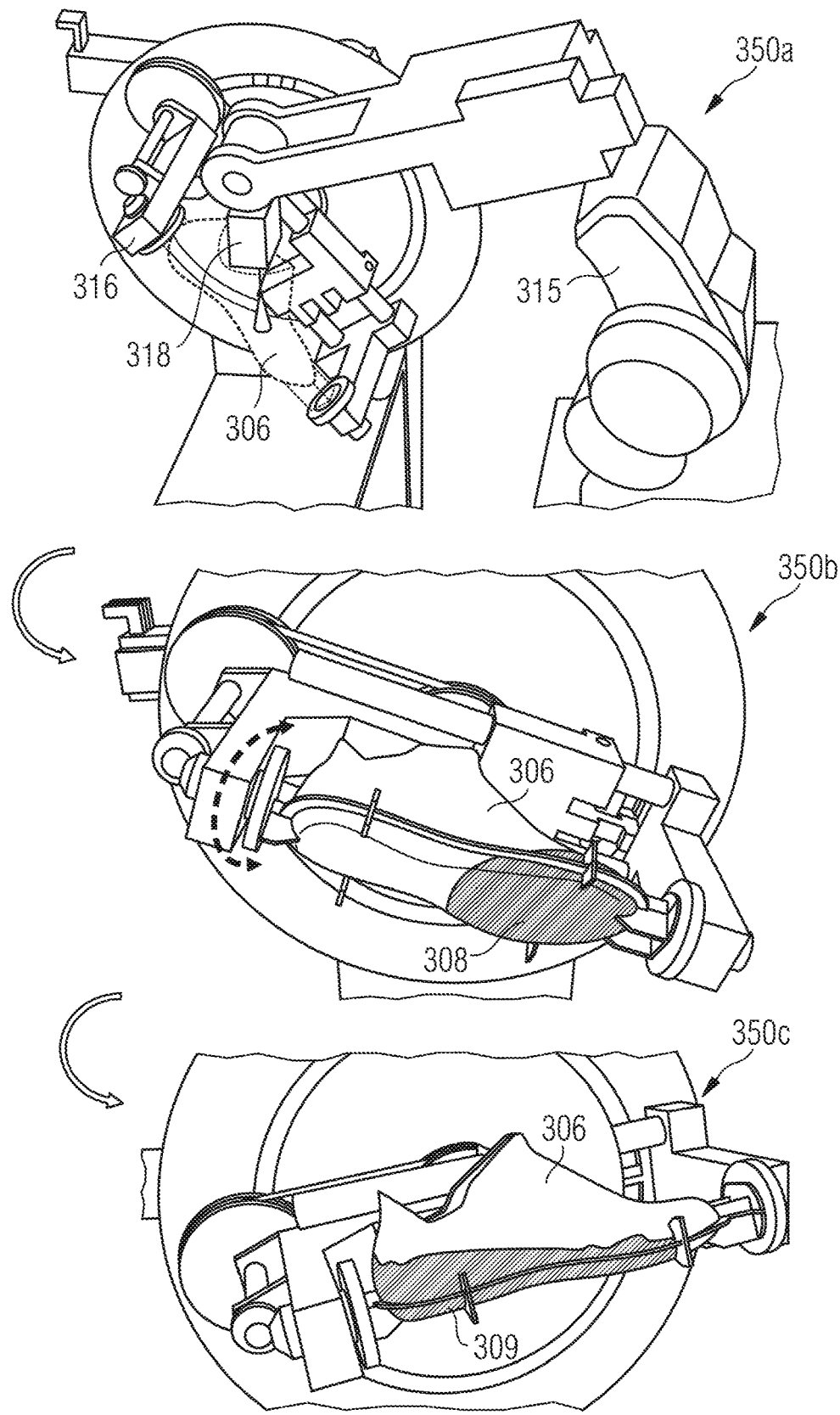

FIG. 3e presents other embodiments 350a-c of the present invention, wherein the mold may be a multi-axis mounted mold 306. For example, the mold 306 may be attached in a gimbal 316, i.e. a kinematic system with at least two degrees of freedom, and the robot arm 315 may comprise a mechanism for depositing the first material into the mold 306, for example an injection nozzle 318 or another dosing unit. It has to be noted that the mold 306 may also comprise at least one aspect(s) of the molds 205 and 305 as explained above. Moreover, the mold 306 may comprise at least one localized heat source(s), e.g. heating elements, wherein a first localized heat source 308 may be arranged in the forefoot part and a second localized heat source 309 may be arranged in the bottom part of the mold 306. Alternatively or additionally, at least one localized heat source(s) may have inner modular heating elements, for example electrical heating patrons which may be inserted into cavities of the mold 306. The electricity may then be created via induction. In some embodiments, there are flexible heating bands which may be laid on the outside of the mold 306, i.e. direct contact heating. Electric heating elements would have the benefit that, compared to oil based heating for example, there is no need for oil supply lines and thus the process may be safer for workers.

As may be seen in embodiments in 350a, the selective depositing of the first material into selected areas of the mold 306, for example in the forefoot part of the mold 306, may be performed by a movement of the robot arm 315 equipped with the injection nozzle 318. Such embodiments may make the material supply to the nozzle much easier, because the injection nozzle 318 is not rotating. If the injection nozzle 318, i.e. the dosing unit with material supply, would be directly attached to the mold 306, then the injection nozzle 318 would necessarily rotate as well.

In embodiments in 350b, the mold 306 may be vibrated or moved, e.g. through a seesaw movement in the gimbal 316 (as indicated with the dashed double arrow), so that the first material may be deposited, and the first localized heat source 308 arranged in the forefoot part of the mold 306 may start to heat the first material. Then, the heated selected portion of the first material may be solidified, e.g. by cooling the mold 306 with surrounding air.

As may be seen in embodiments in 350c, after solidifying the first material, a second material may be deposited into the bottom part of the mold 306 by moving the robot arm 315 equipped with the injection nozzle 318. Thus, the mold 306 may be vibrated to modify the distribution of the second material in the mold 306 and melting and/or solidifying at least a portion of the second material after being heated by the second localized heat source 309 arranged in the bottom part of the mold 306.

Figure 4:
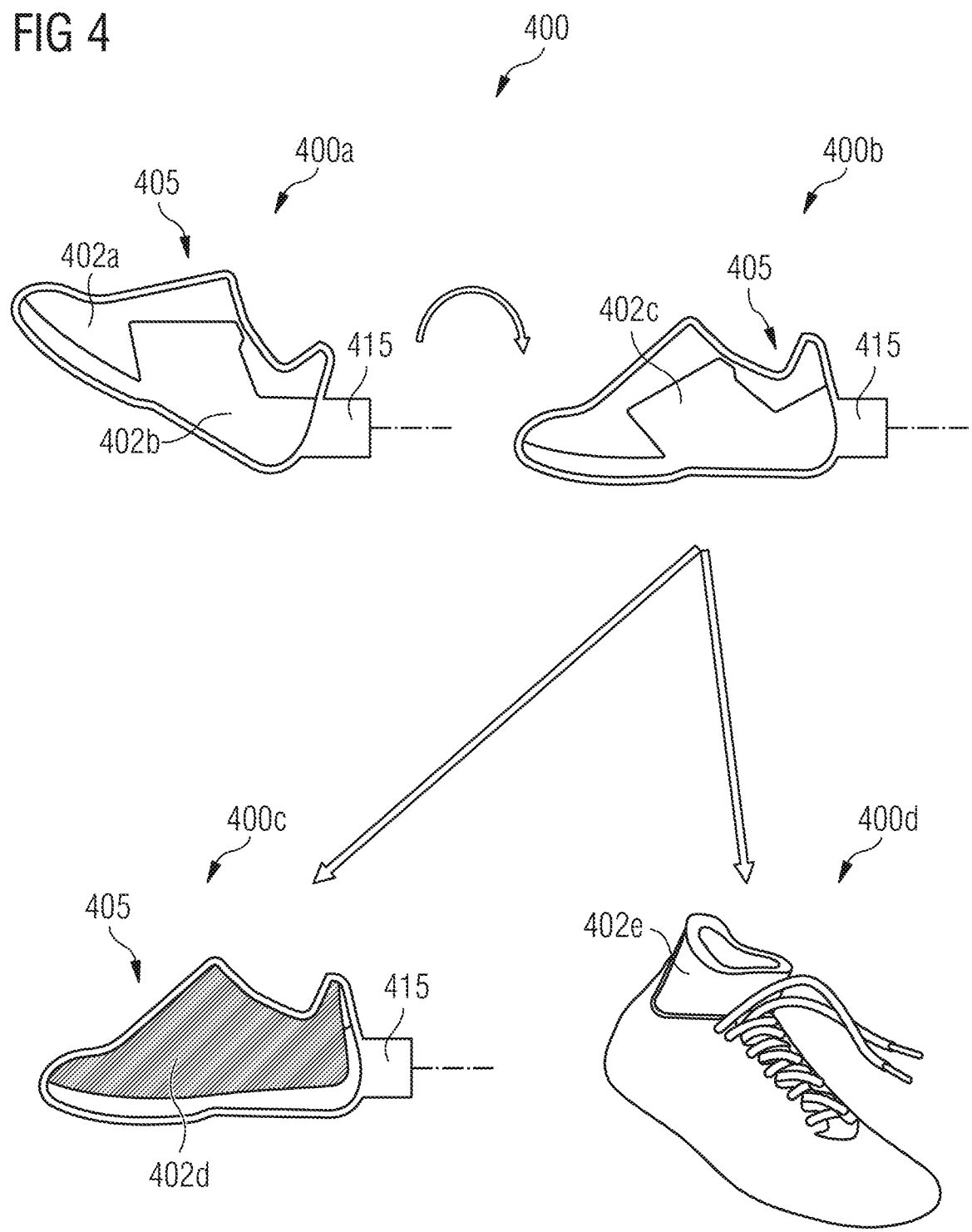
FIG. 4 is a schematic view of a molding cycle for producing at least a part of a sporting good, in particular a sports shoe according to certain embodiments of the present invention.

FIG. 4 presents a schematic view of some embodiments of a sports shoe 400, wherein at least a part of the sports shoe 400 is produced by a method according to the invention.

As shown in embodiments in 400a, an inner sock 402a may be pulled over a last (not shown in FIG. 4) and may be inserted into the negative mold 405 which may be similar to the molds 105, 205, 305 and 306 of FIGS. 1-3. Alternatively, an inflatable last may be used, which has been be sprayed with fibers for creating an inner lining, and which will be removed and may be reused again after the process. In a first molding cycle, a first material, e.g. providing more rigid properties after molding, may be deposited onto the inner sock 402a inside the negative mold 405 and the negative mold 405 may be vibrated and/or oriented by the robot arm 415 so that an accumulation of particles of the first material may be obtained only in the heel part. After melting and solidifying, the first material may form a heel cap and/or a cage insert 402b.

As shown in embodiments in 400b corresponding to a second molding cycle, a second material, e.g. providing more flexible properties after molding, may be at least partly deposited onto the melted and/or solidified portion of the first material inside the negative mold 405. Using the robot arm 415, the negative mold 405 may be then vibrated and/or oriented so that an accumulation of particles of the second material may be obtained over the entire surface of the inner sock 402a including the molded heel cap and/or cage insert 402b, i.e. the second material may form an intermediate layer 402c of the shoe upper of the sports shoe 400. Beneficially, the negative mold 405 may comprise a structured inner wall, in particular a structured inner wall that is adapted to determine the structure of the layer 402c. The structured inner wall may extend 360° around the inner sock 402a.

As may be seen in FIG. 4, there are two further embodiments 400c and 400d. The embodiments in 400c may correspond to a third molding cycle, wherein a third material, e.g. providing another set of properties after molding such as blown on fibers or flocking, may be at least partly deposited onto the melted and/or solidified portion of the second material inside the negative mold 405. Using the robot arm 415, the negative mold 405 may then be vibrated and/or oriented so that an accumulation of particles of the third material may be obtained over a part or the entire surface of the intermediate layer 402c including the molded heel cap and/or cage insert 402b, i.e. the third material may form a soft outer layer 402d or padded layer of the shoe upper of the sports shoe 400. Beneficially, the negative mold 405 may comprise a structured inner wall, in particular a structured inner wall that is adapted to determine the structure of the outer layer 402d which may or may not be the same structure as the intermediate layer 402c.

In some embodiments, the embodiments in 400d may correspond to a sports shoe which may be produced with a production step, wherein a textile, in particular a non-woven or knitted inner sock 402e covering the ankle portion of a foot of a user may be inserted into the sports shoe 400 instead of or in addition to the soft outer layer 402d.

Figure 5A:
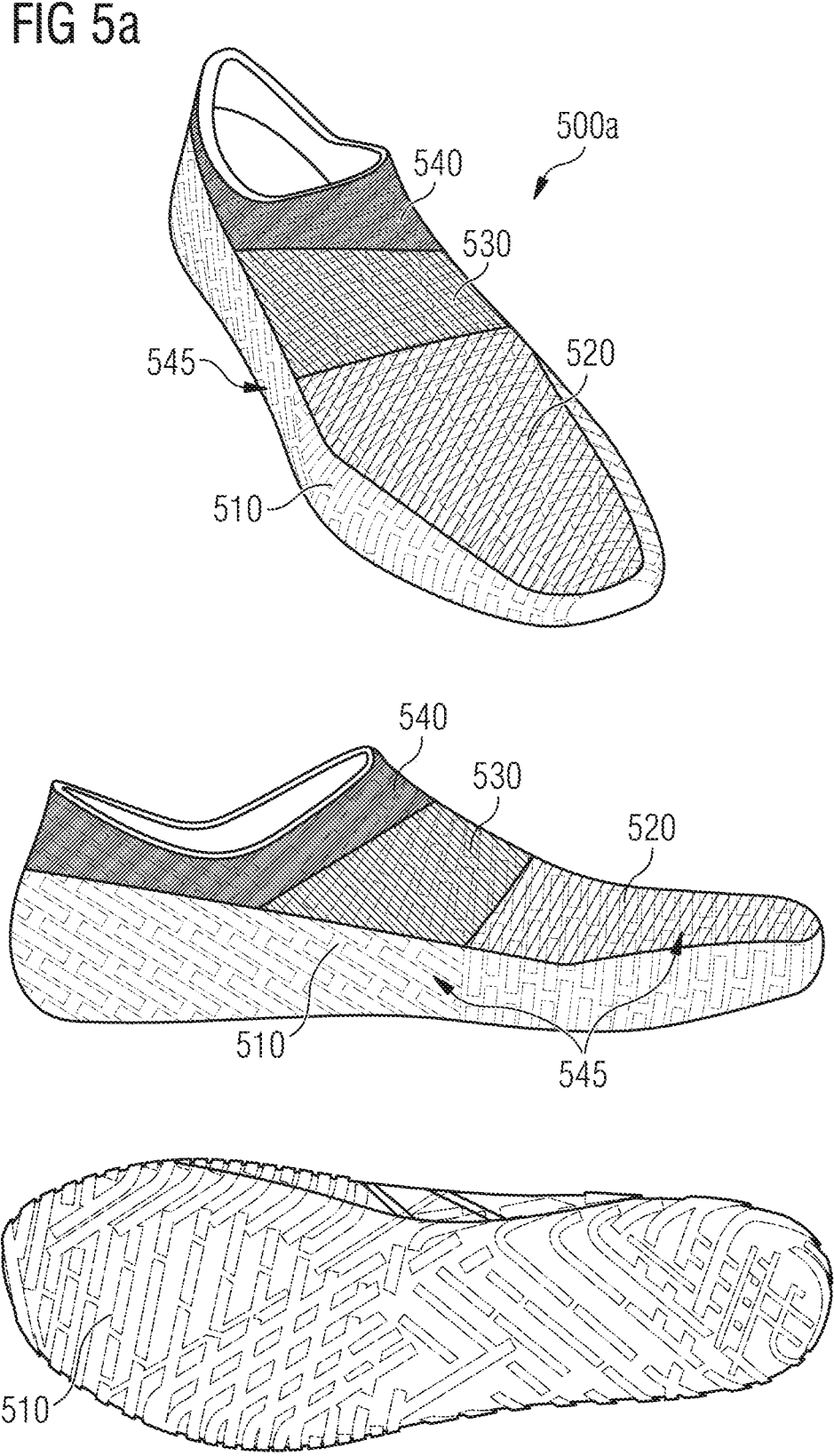
FIG. 5a is a perspective view, a side view, and a bottom view of a shoe produced according to certain embodiments of the present invention for a system for producing at least a part of a sporting good, in particular a sports shoe.
Figure 5B:
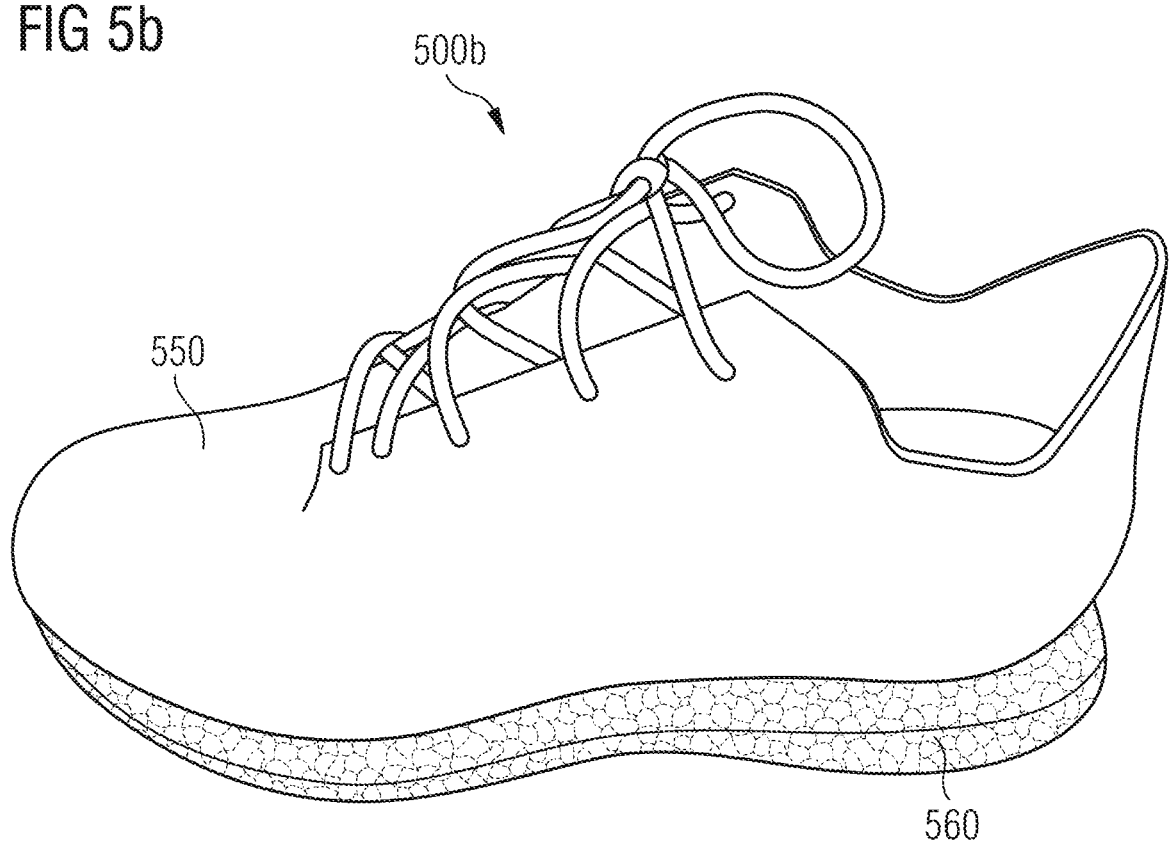
FIG. 5b is a perspective view of a shoe produced according to certain embodiments of the present invention for a system for producing at least a part of a sporting good, in particular a sports shoe.

FIGS. 5a-b present embodiments of sports shoes 500a and 500b, wherein at least a part thereof is produced by a method according to the invention.

FIG. 5a presents a sports shoe 500a in front perspective view, medial side view and bottom view. The sports shoe 500a comprises four elements, namely a bottom element 510, a forefoot element 520, a midfoot element 530 and a collar element 540. Other embodiments of a sports shoe may comprise more or less elements than the sports shoe 500a.

At least a part of at least one of the elements 510, 520, 530, 540 may be produced by a method according to the invention as describe above. Accordingly, each of the four materials for the four elements may be selectively deposited into a mold in a respective step, vibrated to modify the distribution of the respective material, selectively melted and/or solidified. For example, in a first step, the first material for the bottom element 510 may be selectively deposited into a mold, e.g. mold 305, vibrated to modify the distribution of the first material, selectively melted and selectively solidified. In a second step, the same process may be applied to the second material for the forefoot element 520 and to the third material for the midfoot element 530. Finally, in a last step, the same process may also be applied to the fourth material for the collar element 540. Moreover, at least one element may comprise a TPU material.

In the embodiments in 500a, the bottom element 510 may comprise a higher hardness than the other elements and the midfoot element 530 may comprise a higher hardness than the forefoot element 520 and/or the collar element 540. In some embodiments, the four elements may comprise a hardness from 60A-83D Shore hardness, in some embodiments, from 90A-60D.

In other embodiments, the bottom element 510 may comprise a lower hardness than the other elements in case a higher flexibility and/or a higher grip/traction of the sole is needed.

As may be seen in FIG. 5a, the sports shoe 500a may comprise protruding elements 545, e.g. textures, extending 360° around the sports shoe 500a. These protruding elements 545 may be achieved by using a mold comprising a structured inner wall that is adapted to determine the structure of an outer layer of an upper of the sports shoe 500a. By having such protruding elements 545, the properties, e.g. bending, of the sports shoe 500a may be further improved instead of having protruding elements only on the soles as regular shoes have.

In other embodiments, a placing device, e.g. masks, inserts, placeholders, etc., may be put into the negative mold before a material is deposited to prevent a transition zone between two different materials, e.g. between the first material for the bottom element 510 and the second material for the forefoot element 520. The placing device may be placed in areas of the mold where the material should not be distributed during the vibrating step. By using such a placing device, sharp contours between two different materials may be created as may be seen in FIG. 5a. For example, when the bottom element 510 is produced, a mask may be inserted into the mold covering the upper forefoot, midfoot and heel area of the mold. Alternatively or additionally, in some embodiments, the material layers may overlap on their edges, except when the above explained placing device is used.

FIG. 5b presents a sports shoe 500b including an upper 550 produced by a method according to the present invention. The upper 550 of the sports shoe 500b comprises a first material, which has been deposited into a mold, e.g. mold 305, vibrated to modify the distribution of the first material, and selectively melted and/or solidified according to one of the methods as shown in FIGS. 3a-e.

Furthermore, the midsole 560 of the sports shoe 500b may comprise a plurality of randomly arranged expanded particles. These particles may be made from an expanded material such as expanded thermoplastic polyurethane. In some embodiments, any other appropriate material may be used. Furthermore, the expanded particles may be randomly arranged or arranged with a certain pattern inside a mold.

In the following, further examples are described to facilitate the understanding of the invention:

Example 1

A method for producing at least a part of a sporting good, in particular a sports shoe (400), the method comprising the following steps:
Depositing a first material into a mold (105; 205; 305; 405); and
Vibrating the mold (105; 205; 305; 405) to modify the distribution of the first material in the mold (105; 205; 305; 405).

Example 2

The method of claim 1, wherein vibrating the mold (105; 205; 305; 405) comprises a two or three-dimensional movement of the mold (105; 205; 305; 405).

Example 3

The method of any of the preceding claims, further comprising the step of at least partially melting and/or solidifying at least a portion of the first material.

Example 4

The method of the preceding claim, wherein melting and/or solidifying comprises a selective melting and/or solidifying of a selected portion of the first material, preferably by using a localized heat and/or cooling source of the mold (105; 205; 305; 405) or locally affecting the mold (105; 205; 305; 405).

Example 5

A method for producing at least a part of a sporting good, in particular a sports shoe, the method comprising the following steps:
depositing a first material into a mold (105; 205; 305; 405) and
selectively at least partly melting and/or solidifying of a selected portion of the first material, preferably by using a localized heat and/or cooling source of the mold or locally affecting the mold.

Example 6

The method of one of the claim 4 or 5, wherein selectively melting and/or solidifying, preferably by using a localized heat and/or cooling source of the mold or locally affecting the mold, comprises a two or three-dimensional movement of the mold.

Example 7

The method of any of the preceding claims, wherein depositing the material into the mold (105; 205; 305; 405) comprises a selective depositing of the first material into selected areas of the mold (105; 205; 305; 405).

Example 8

The method of the preceding claim, wherein the selective depositing of the first material involves a movement of the mold (105; 205; 305; 405).

Example 9

The method of one of the claim 7 or 8, wherein the selective depositing is performed with an accuracy of less than 3 cm, preferably less than 2 cm and more preferably less than 1 cm.

Example 10

The method of any of the preceding claims, further comprising the steps of
depositing a second material into the mold (105; 205; 305; 405);
vibrating the mold to modify the distribution of the second material in the mold (105; 205; 305; 405); and
at least partially melting and/or solidifying at least a portion of the second material.

Example 11

The method of the preceding claim, wherein the second material is at least partly deposited onto the at least partially melted and/or solidified portion of the first material.

Example 12

The method of one of the claim 10 or 11, wherein the first and/or the second material comprise foamed particles and/or fibers.

Example 13

The method of one of the claims 10-12, wherein the first and the second material are from the same material class, in particular a thermoplastic elastomer.

Example 14

The method of the preceding claim, wherein the thermoplastic elastomer is selected from the group of thermoplastic polyurethanes, TPU, thermoplastic polyester-elastomers, preferably polyetherester and/or polyester, thermoplastic copolyamides, preferably thermoplastic styrene- and/or butadiene-blockcopolymers.

Example 15

The method of any of the preceding claims, wherein the first and/or the second material is a granulate, a microgranulate or a powder, preferably with a diameter less than 5 mm, preferably less than 3 mm and more preferably less than 1 mm.

Example 16

The method of any of the preceding claims, further comprising the step of positioning one or more inserts in the mold before and/or after depositing the first and/or the second material.

Example 17

The method of any of the preceding claims, wherein the mold (105; 205; 305; 405) is a negative mold (105; 205; 305; 405) of an essentially complete sporting good, in particular a shinguard, a ball or a sport shoe (400).

Example 18

The method of the preceding claim, wherein the mold comprises a structured inner wall, in particular a structured inner wall that is adapted to determine the structure of an outer layer of an upper of a sport shoe (400).

Example 19

The method of any of the preceding claims, wherein the mold (105; 205; 305; 405) is moved by means of a robot arm (215; 315; 415), the robot arm being capable to perform 3D movements of the mold (105; 205; 305; 405).

Example 20

The method of one of the claims 1-19, wherein the mold is a multi-axis mounted mold.

Example 21

Sporting good, in particular sport shoe (400), wherein at least a part of the sporting good is produced by a method of any of the preceding claims.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for producing at least a part of a sports shoe, the method comprising:
    depositing a first particulate material into a mold, wherein each particle of the first particulate material comprises an outer surface;
    re-orienting the mold to accumulate the first particulate material in a first localized part of the mold;
    locally affecting the first localized part of the mold using a first localized affecting source to join the particles of the first particulate material by melting the outer surfaces of the particles without entirely melting the particles in the first localized part of the mold, wherein the first localized affecting source is integrally formed within a first region within at least one wall of the mold;
    after the locally affecting the first localized part of the mold, depositing a second particulate material into the mold, wherein each particle of the first particulate material comprises an outer surface;
    re-orienting the mold to accumulate the second particulate material in a second localized part of the mold; and
    locally affecting the second localized part of the mold using a second localized affecting source to join the particles of the second particulate material by melting the outer surfaces of the particles without entirely melting the particles in the second localized part of the mold, wherein the second localized affecting source is integrally formed within a second region within at least one wall of the mold.

2. The method of claim 1, wherein the first localized part of the mold is different from the second localized part of the mold.

3. The method of claim 1, wherein at least one of locally affecting the first localized part of the mold or locally affecting the second localized part of the mold comprises a two- or three-dimensional movement of the mold.

4. The method of claim 1, wherein the depositing the first particulate material into the mold comprises a selective depositing of the first particulate material into selected areas of the mold.

5. The method of claim 4, wherein the selective depositing of the first particulate material comprises a movement of the mold.

6. The method of claim 1, wherein the first particulate material is different from the second particulate material.

7. The method of claim 1, wherein the second particulate material is at least partly deposited onto the at least one of partially melted or solidified portion of the first particulate material.

8. The method of claim 1, wherein at least one of the first particulate material or the second particulate material comprise at least one of foamed particles or fibers.

9. The method of claim 1, wherein the first particulate material and the second particulate material are from a same material class comprising a thermoplastic elastomer.

10. The method of claim 9, wherein the thermoplastic elastomer is selected from the group consisting of thermoplastic polyurethanes and thermoplastic polyester-elastomers.

11. The method of claim 1, further comprising positioning at least one insert in the mold at least one of before or after depositing at least one of the first particulate material or the second particulate material.

12. The method of claim 1, wherein the mold comprises a negative mold of a substantially complete sports shoe.

13. The method of claim 12, wherein the mold comprises a structured inner wall that is configured to determine a structure of an outer layer of an upper of the sport shoe.

14. The method of claim 1, wherein the mold is moved by a robot arm, the robot arm being capable of performing three-dimensional movements of the mold.

15. The method of claim 1, wherein the mold comprises a multi-axis mounted mold.

16. The method of claim 1, wherein each of the first localized affecting source and the second localized affecting source comprises at least one of a heating source or a cooling source.

17. The method of claim 1, wherein the first region comprises a forefoot portion of the sports shoe and the second region comprises a bottom portion of the sports shoe.

* * * * *